US009252669B2

(12) United States Patent
Nate et al.

(10) Patent No.: US 9,252,669 B2
(45) Date of Patent: Feb. 2, 2016

(54) AC/DC CONVERTER, AND AC POWER ADAPTER AND ELECTRONIC APPARATUS USING THE SAME

(75) Inventors: Satoru Nate, Kyoto (JP); Hiroshi Hayashi, Kyoto (JP)

(73) Assignee: ROHM CO., LTD. (JP)

( * ) Notice: Subject to any disclaimer, the term of this patent is extended or adjusted under 35 U.S.C. 154(b) by 55 days.

(21) Appl. No.: 13/555,384

(22) Filed: Jul. 23, 2012

(65) Prior Publication Data

US 2013/0027983 A1    Jan. 31, 2013

(30) Foreign Application Priority Data

Jul. 26, 2011    (JP) .................................. 2011-163224

(51) Int. Cl.
*H02M 3/335*    (2006.01)
*H02M 1/32*    (2007.01)

(52) U.S. Cl.
CPC ........ *H02M 3/335* (2013.01); *H02M 2001/322* (2013.01)

(58) Field of Classification Search
CPC ..... H02M 3/07; H02M 3/18; H02M 3/33507; H02M 3/33523; H02M 3/335; H02M 2001/0032; H02M 7/006; H02M 7/068; H02M 7/153; H02M 7/06; H02M 7/49; H02M 7/483; H02M 7/487; H02M 7/497; H02M 7/515; H02M 7/525; H02M 1/32; H02M 1/045; H02M 1/12; H02M 1/084; Y02B 70/126; H01F 27/40; H01F 38/42; H02J 7/345; H02J 7/0016; Y02E 60/13; H03K 3/53; H03K 3/537; G01R 15/14
USPC ............... 363/21.01, 21.12, 66, 43, 137, 126, 363/21.13; 320/166; 307/109, 100, 326; 361/92
See application file for complete search history.

(56) References Cited

U.S. PATENT DOCUMENTS

| 6,040,969 | A  | * | 3/2000  | Winch et al. ..................... 361/82 |
| 6,654,217 | B2 | * | 11/2003 | Zylstra et al. ..................... 361/77 |
| 7,161,816 | B2 | * | 1/2007  | Shteynberg et al. ....... 363/21.13 |
| 7,200,015 | B1 | * | 4/2007  | Mirskiy ......................... 363/47 |
| 7,504,750 | B2 | * | 3/2009  | Bienvenu et al. ............. 307/138 |
| 8,305,047 | B2 | * | 11/2012 | Lin et al. ....................... 320/166 |
| 8,487,591 | B1 | * | 7/2013  | Draper et al. ................. 320/166 |
| 2004/0125531 | A1 | * | 7/2004 | Nguyen et al. ................ 361/118 |
| 2013/0027999 | A1 | * | 1/2013 | Ptacek et al. .................. 363/126 |
| 2013/0076315 | A1 | * | 3/2013 | Liu et al. ....................... 320/166 |
| 2013/0170621 | A1 | * | 7/2013 | Saka et al. .................... 378/104 |

FOREIGN PATENT DOCUMENTS

| JP | 2-211055 A   | 8/1990 |
| JP | 9-98571 A    | 4/1997 |
| JP | 2005-353306 A | 12/2005 |

\* cited by examiner

*Primary Examiner* — Gary L Laxton
*Assistant Examiner* — Kevin H Sprenger
(74) *Attorney, Agent, or Firm* — Cantor Colburn LLP

(57) ABSTRACT

The present invention provides an Alternating Current/Direct Current (AC/DC) converter employing measures not only against residual voltage but also to reduce power consumption. The AC/DC converter receives an Alternating Current (AC) voltage through a concentric plug and converts the AC voltage into a Direct Current (DC) voltage. A discharge path is disposed on a path from a discharge terminal to a ground terminal. A detection circuit compares a wave detection voltage with a predetermined threshold voltage, and enables the discharge path to be turned on when the wave detection voltage is continuously lower than the threshold voltage for a predetermined detection time.

8 Claims, 7 Drawing Sheets

AC/DC CONVERTER, AND AC POWER ADAPTER AND ELECTRONIC APPARATUS USING THE SAME

BACKGROUND OF THE INVENTION

1. Field of the Invention

The present invention relates to an Alternating Current/Direct Current (AC/DC) converter for converting a commercial Alternating Current (AC) voltage into a Direct Current (DC) voltage.

2. Description of the Related Art

Electronic apparatus, such as personal computers, television sets, and video recorders, operate by using an external AC voltage as power. An electronic apparatus of this kind has an AC/DC converter built in for performing AC/DC conversion on a commercial AC voltage, or an external power adapter (AC power adapter) including the AC/DC converter.

FIG. 1 is a circuit diagram illustrating the structure of a power adapter 100r on which the inventors' research was based. The power adapter 100r of FIG. 1 is an AC/DC converter for converting an AC voltage $V_{AC}$ into a DC voltage $V_{DC}$, which includes a concentric plug 102, a discharge resistor R1, a filter circuit 10, a rectifier and smoothing circuit 20, a Direct Current/Direct Current (DC/DC) converter 30r, and an apparatus side connector 106.

When inserted into a socket 2 of an insertion connector for wiring, the concentric plug 102 receives the commercial AC voltage $V_{AC}$. The filter circuit 10 removes noise of the commercial AC voltage $V_{AC}$. A diode bridge circuit 22 of the rectifier and smoothing circuit 20 performs full-wave rectification on the AC voltage $V_{AC}$ of the filter circuit 10. A smoothing capacitor C21 of the rectifier and smoothing circuit 20 smooths the voltage rectified by the diode bridge circuit 22.

The DC/DC converter 30r converts a voltage level of a smoothed DC voltage $V_{IN}$. The DC voltage $V_{DC}$ stabilized at a certain voltage level by the DC/DC converter 30r is supplied to an electronic apparatus 1 through the apparatus side connector 106. The discharge resistor R1, the filter circuit 10, the diode bridge circuit 22, the smoothing capacitor C21, and the DC/DC converter 30r are built in a frame body 104 of the power adapter 100r. The connection between the frame body 104 and the concentric plug 102 and the connection between the frame body 104 and the apparatus side connector 106 are achieved respectively through cables.

PRIOR ART DOCUMENT

Patent Document 1: Japanese Patent Publication No. 2005-353306
Patent Document 2: Japanese Patent Publication No. 9-098571
Patent Document 3: Japanese Patent Publication No. 2-211055

SUMMARY OF THE INVENTION

Problems to be Solved by the Present Invention

When a concentric plug 102 is in a state of being inserted into a socket 2, an electric potential difference corresponding to a commercial AC voltage $V_{AC}$ is generated between a Live (L) line and a Neutral (N) line of the power adapter 100r. When the concentric plug 102 is pulled out of the socket 2, the commercial AC voltage $V_{AC}$ is not applied externally. However, capacitors C11, C12 forming a filter circuit 10 each continue to keep a charge, known as a residual voltage, so that a residual electric potential difference of the L line and the N line does not become zero immediately. Regulations require the residual voltage to become lower than a predetermined voltage within a predetermined time after the concentric plug 102 is pulled out of the socket 2.

If Electro-Magnetic Compatibility (EMC) is taken into account, for the capacitors C11, C12, in most cases, 0.1 µF to 0.47 µF is used, so that without any corresponding measures being taken, a residence time of the residual voltage is extended. In the power adapter 100r of FIG. 1, in order to shorten the residence time, a discharge resistor R1 is inserted between the L line and the N line. Therefore, the charges of the capacitors C11, C12 are released through the discharge resistor R1, thereby decreasing the residual voltage.

However, the discharge resistor R1 can consume additional power when the concentric plug 102 is inserted in the socket 2. The power Pd consumed by the discharge resistor R1 is calculated as:

$$Pd = V_{AC}^2 / R1$$

if it is assumed that $V_{AC}$=240 V and R1=4 MΩ, Pd=14.4 mW.

Increasingly strict requirements have been introduced mandating that power consumed by a standby electronic apparatus be limited to, for example, 50 mW. Therefore, if the discharge resistor R1 consumes power of 14.4 mW, it is difficult to limit overall power consumption to 50 mW. The same problem also occurs on an AC/DC converter built into an electronic apparatus 1.

Exemplary objectives of the present invention are to provide an AC/DC converter that not only takes measures against residual voltage but also reduces power consumption.

Technical Means for Solving the Problem

An embodiment of the present invention relates to an AC/DC converter, which receives an AC voltage through a concentric plug and converts the AC voltage into a DC voltage. The AC/DC converter includes: a Live (L) line and a Neutral (N) line, to which the AC voltage is applied; a filter circuit, including at least one capacitor disposed between the L line and the N line, and filtering the AC voltage; a rectifier and smoothing circuit, rectifying and smoothing an output of the filter circuit; and a Direct Current/Direct Current (DC/DC) converter, receiving an output voltage of the rectifier and smoothing circuit to generate a DC voltage. The DC/DC converter includes: an output capacitor; a diode, having a cathode connected to the output capacitor; a transformer, including a primary coil connected to an output terminal of the rectifier and smoothing circuit, and a secondary coil connected to an anode of the diode; a switching transistor, connected to the primary coil; a control circuit, controlling the switching transistor; and a wave detection circuit, generating a wave detection voltage corresponding to an input voltage of the rectifier and smoothing circuit. The control circuit includes: a ground terminal, grounded when in a use state; a discharge terminal, connected to any of the L line, the N line, and the output terminal of the rectifier and smoothing circuit; a discharge path, disposed on a path from the discharge terminal to the ground terminal; a detection terminal, receiving the wave detection voltage generated by the wave detection circuit; and a detection circuit, comparing the wave detection voltage with a predetermined threshold voltage, and enabling the discharge path to be turned on when the wave detection voltage is continuously lower than the threshold voltage for a predetermined detection time.

When a concentric plug is pulled out of a socket, supply of AC voltage is stopped, and the level of a wave detection voltage decreases. Therefore, by comparing the wave detection voltage with a threshold voltage, it is detected that the concentric plug has been pulled out of the socket. In response to the detection, a discharge path is turned on, so as to release charges accumulated in a capacitor of a filter circuit, which enables a residual voltage to drop lower than a predetermined level within a predetermined period, thereby complying with relevant regulations.

Furthermore, the discharge path is turned off when the concentric plug is in the socket, thereby suppressing extra power consumption during normal use.

Furthermore, when the concentric plug is being inserted into the socket, a case may occur in which the AC voltage may be interrupted after being affected by noise for several alternating cycles and recover afterward. During an interruption of the AC voltage lasting several cycles, the discharge path is not to be turned on. Instead, the discharge path is turned on when the wave detection voltage is continuously lower than the threshold voltage for the predetermined detection time, so that when AC voltage is interrupted for several cycles, the discharge path can be kept in a turn-off state.

The detection circuit includes: a comparator, comparing the wave detection voltage with the threshold voltage, and generating a valid first comparison signal when the wave detection voltage is lower; a timer circuit, generating a valid second comparison signal when a valid time of the first comparison signal exceeds the detection time; and a logic gate, enabling the discharge path to be turned on when the first comparison signal and the second comparison signal are both valid.

The control circuit further includes a power supply terminal receiving a power supply voltage. The discharge path includes: a first discharge switch, disposed between the power supply terminal and the ground terminal, and controlled according to a control signal from the detection circuit; and a second discharge switch, disposed between the discharge terminal and the power supply terminal, and turned on when an electric potential of the power supply terminal is lower than a predetermined second threshold voltage.

Therefore, after a voltage of a power supply terminal decreases sufficiently, the charge of the capacitor of the filter circuit can be released.

Another embodiment of the present invention is also an AC/DC converter. The AC/DC converter includes: a Live (L) line and a Neutral (N) line, to which the AC voltage is applied; a filter circuit, including at least one capacitor disposed between the L line and the N line; and filtering the AC voltage; a rectifier and smoothing circuit, rectifying and smoothing an output of the filter circuit; and a Direct Current/Direct Current (DC/DC) converter, receiving an output voltage of the rectifier and smoothing circuit to generate a DC voltage. The DC/DC converter includes: an output capacitor; a diode, having a cathode connected to the output capacitor; a transformer, including a primary coil connected to an output terminal of the rectifier and smoothing circuit, and a secondary coil connected to an anode of the diode; a switching transistor, connected to the primary coil; a control circuit, controlling the switching transistor; and a wave detection circuit, generating a wave detection voltage corresponding to an input voltage of the rectifier and smoothing circuit. The control circuit includes: a detection terminal, to which the wave detection voltage generated by the wave detection circuit is applied; and a detection circuit, comparing the wave detection voltage with a predetermined threshold voltage, and enabling the switching transistor to be turned on when the wave detection voltage is continuously lower than the threshold voltage for a predetermined detection time.

According to this embodiment, a switching transistor is used as a discharge switch, so as to decrease the area of a circuit.

Another embodiment of the present invention relates to an AC power adapter. The AC power adapter includes the AC/DC converter as stated above.

Another embodiment of the present invention relates to an electronic apparatus. The electronic apparatus also includes the AC/DC converter.

Furthermore, any combination of the constituent elements of the present invention and those achieved through substitution of methods, devices and systems can also be used as embodiments of the present invention.

Effects of the Present Invention

The present invention not only complies with regulations on the residual voltage, but also reduces power consumption.

DETAILED DESCRIPTION OF THE INVENTION

The present invention based on the preferred embodiment is described below with reference to the accompanying drawings. The same or equal element, part, or process, contained in each of the accompanying drawings, will be denoted by a same symbol, and the repeat descriptions for them will be omitted suitably. Furthermore, the embodiment should not be limited to the illustrations of the invention. In other words, all of the features and the combinations thereof mentioned in the embodiment are not necessarily the same as the substantive features of the invention.

In the specification, so-called connection between part A and part B includes a directly connection between part A and part B in physically and an indirectly connection between part A and part B through other part that does not affect their electrically connection substantially or does not damage the performance or effect of their combination.

Similarly, so-called a state of part C disposing between part A and part B includes a directly connection between part A and part C or between part B and part C and an indirectly connection between them through other part that does not affect their electrically connection substantially or does not damage the performance or effect of their combination.

Figure 1:
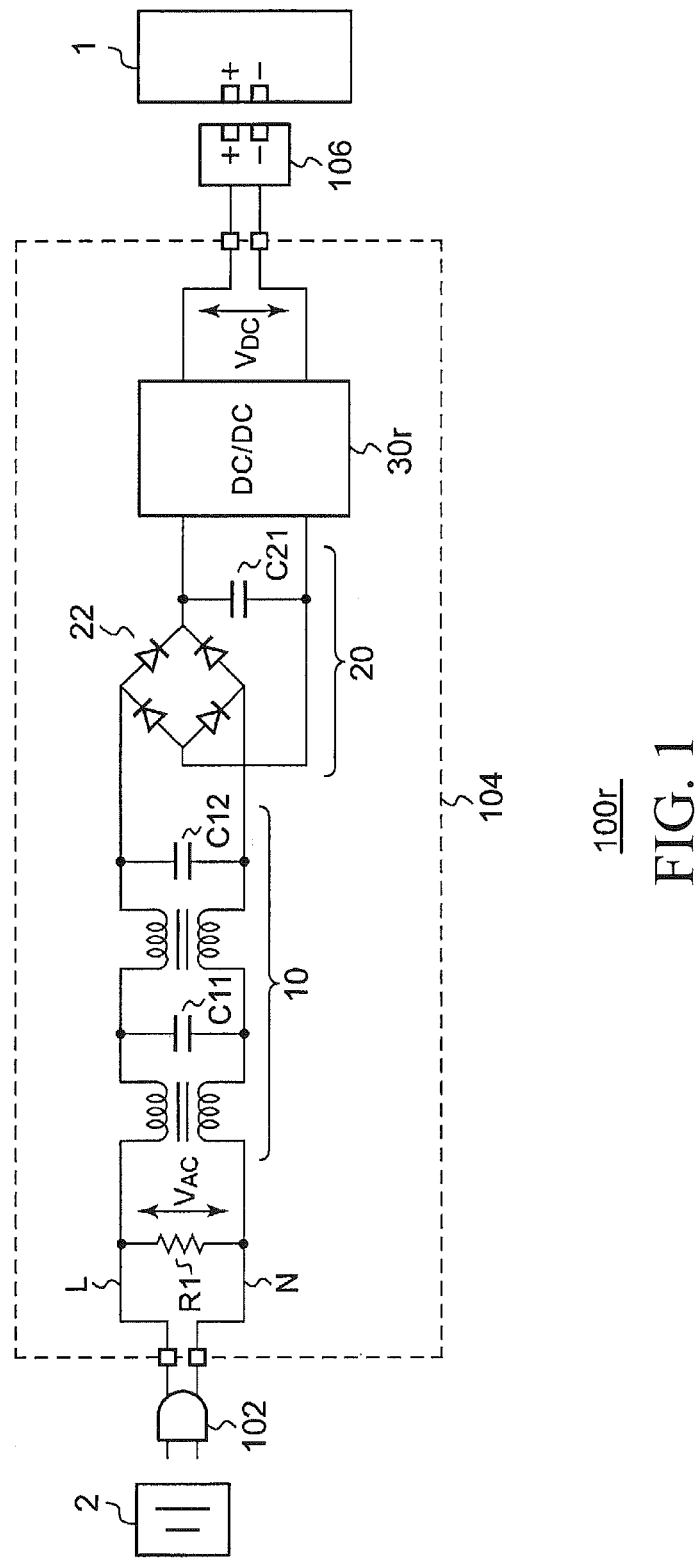
FIG. 1 is a circuit diagram illustrating the structure of a power adapter on which the inventors' research is based.
Figure 2:
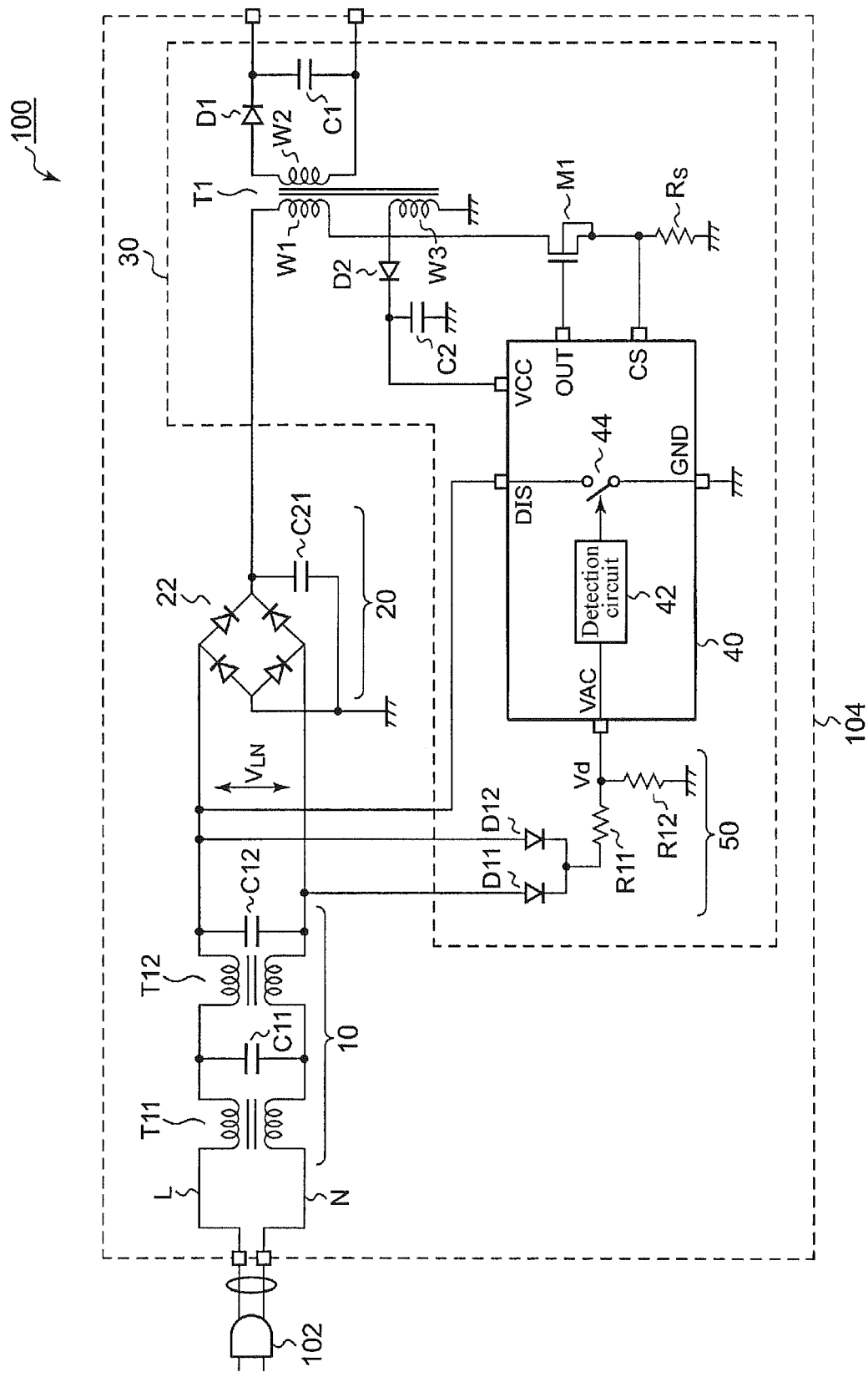
FIG. 2 is a structural view of a power adapter according to an embodiment.

FIG. 2 is a structural view of a power adapter 100 according to an embodiment. The power adapter 100 includes an AC/DC converter, which receives a commercial AC voltage $V_{AC}$ through a concentric plug 102, converts the commercial AC voltage $V_{AC}$ into a DC voltage $V_{DC}$, and supplies the DC voltage $V_{DC}$ to an electronic apparatus, not shown in the drawings. The electronic apparatus is, for, example, a laptop computer, a desktop computer, a mobile phone terminal, or a compact disc (CD) player, though the present invention is not limited thereto.

The power adapter 100 includes an L line, an N line, a filter circuit 10, a rectifier and smoothing circuit 20, and a DC/DC converter 30. The AC voltage $V_{AC}$ is applied to the L line and the N line through the concentric plug 102. The filter circuit 10 includes capacitors C11, C12 disposed between the L line and the N line, and transformers T11, T12 to filter the AC voltage $V_{AC}$ to eliminate noise.

The rectifier and smoothing circuit 20 rectifies and smooths an output voltage of the filter circuit 10. A diode bridge circuit 22 of the rectifier and smoothing circuit 20 performs full-wave rectification on the output voltage of the filter circuit 10. After the full-wave rectification is performed, the voltage passes through a smoothing capacitor C22 to be smoothed.

The DC/DC converter 30 receives a DC voltage $V_{IN}$ rectified and smoothed by the rectifier and smoothing circuit 20, so as to generate the DC voltage $V_{DC}$.

The DC/DC converter 30 mainly includes an output capacitor C1, a diode D1, a transformer T1, a switching transistor M1, a control IC 40, and a wave detection circuit 50.

The transformer T1 includes a primary winding W1, a secondary winding W2, and an auxiliary winding W3. An anode of the diode D1 is connected to one end of the secondary winding W2. The output capacitor C1 is disposed between the other end of the secondary winding W2 and a cathode of the diode D1.

The switching transistor M1 is connected to the primary winding W1. A sense resistor Rs is disposed on a current path of the switching transistor M1. A voltage drop $V_S$ in proportion to a current $I_{M1}$ flowing through the switching transistor M1 is incurred in the sense resistor Rs.

A diode D2 and a capacitor C2 are connected to the auxiliary winding W3 of the transformer T1. The auxiliary winding W3, the diode D2, and the capacitor C2 form an auxiliary converter on a primary side of the transformer T1, which is used to generate a DC voltage $V_{CC}$.

The wave detection circuit 50 generates an input voltage of the rectifier and smoothing circuit 20; in other words, it generates a wave detection voltage Vd corresponding to the output voltage of the filter circuit 10. The wave detection circuit 50 includes diodes D11, D12 and resistors R11, R12. Cathodes of the diodes D11, D12 share the same ground connection, and anodes thereof are respectively connected to the L line and the N line. The resistors R11, R12 divide voltages of the cathodes of the diodes D11, D12, so as to generate the wave detection voltage Vd.

The control IC 40 includes a ground terminal GND, a discharge terminal DIS, a switch terminal OUT, a current detection terminal CS, a power supply terminal VCC, a detection circuit 42, and a discharge path 44. The ground terminal GND is grounded when in a use state. The discharge terminal DIS is connected to the L line or the N line. In FIG. 2, the discharge terminal DIS is connected to the L line. The discharge path 44 is disposed on a path from the discharge terminal DIS to the ground terminal GND, and is configured to be able to switch between on and off.

The DC voltage $V_{CC}$ generated in the capacitor C2 of the auxiliary converter is supplied to the power supply terminal VCC. The control IC 40 operates by using the DC voltage $V_{CC}$ as a power supply.

The wave detection voltage Vd generated by the wave detection circuit 50 is input to a detection terminal VAC. The detection circuit 42 compares the wave detection voltage Vd with a predetermined threshold voltage $V_{TH1}$ and connects the discharge path 44 when the wave detection voltage Vd is continuously lower than the threshold voltage $V_{TH1}$ for a predetermined detection time τd.

A feedback circuit, not shown in the drawings, inputs a feedback signal corresponding to the output voltage $V_{DC}$ of the DC/DC converter 30 to the control IC 40, which is omitted in FIG. 2. The switch terminal OUT of the control IC 40 is connected to a gate of the switching transistor M1, and controls on/off of the switching transistor M1 according to the feedback signal and a detection signal $V_S$, so as to stabilize the DC voltage $V_{DC}$ generated in the output capacitor C1 at a target level. The structure related to on/off of the switching transistor M1 can be achieved through well-know techniques, and is not described in this specification.

Figure 3:
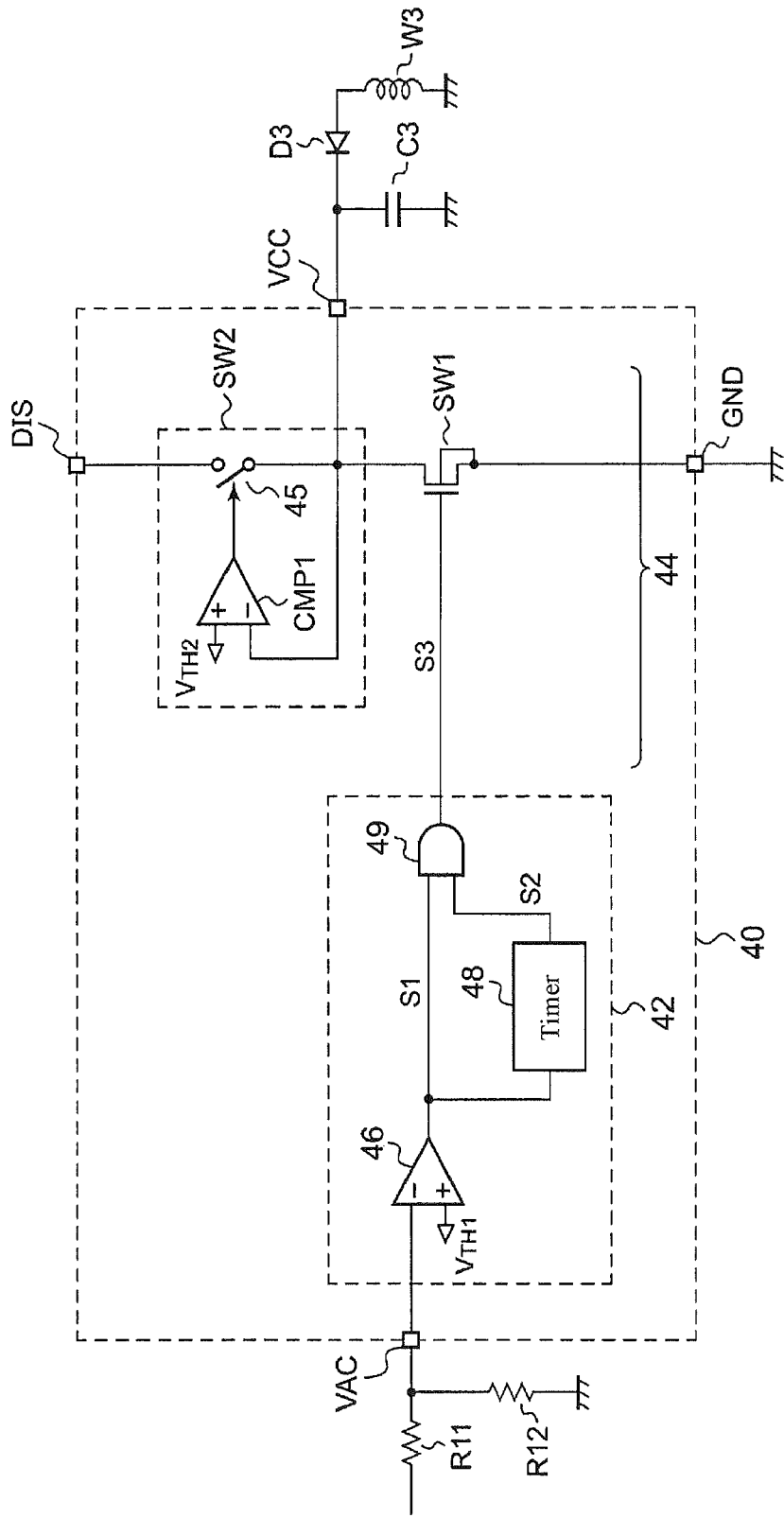
FIG. 3 is a circuit diagram illustrating an example of a specific structure of a control integrated circuit (IC)

FIG. 3 is a circuit diagram illustrating an example of a specific structure of the control IC 40. The detection circuit 42 includes a comparator 46, a timer circuit 48, and a logic gate 49. The comparator 46 compares the wave detection voltage Vd and the threshold voltage $V_{TH1}$, and generates a valid (for example, high level) first comparison signal S1 when the wave detection voltage Vd is lower. When the valid time of the first comparison signal S1 exceeds the detection time τd, the timer circuit 48 generates a valid (for example, high level) second comparison signal S2. When the first comparison signal S1 and the second comparison signal S2 are both valid, the logic gate 49 enables a control signal S3 to be valid. The discharge path 44 enters a turn-on state by enabling the control signal S3 to be valid.

The discharge path 44 in FIG. 3 includes a first discharge switch SW1 and a second discharge switch SW2. The first discharge switch SW1 is disposed between the power supply terminal VCC and the ground terminal GND, and is turned on when the control signal S3 from the detection circuit 42 is valid. The second discharge switch SW2 is disposed between the discharge terminal DIS and the power supply terminal VCC, and is turned on when an electric potential $V_{CC}$ of the power supply terminal VCC is lower than a predetermined second threshold voltage $V_{TH2}$. The second discharge switch SW2 includes a comparator CMP1 for comparing the electric potential $V_{CC}$ of the power supply terminal VCC with the threshold voltage $V_{TH2}$, and a switch 45 for controlling according to an output of the comparator CMP1.

Figure 4:
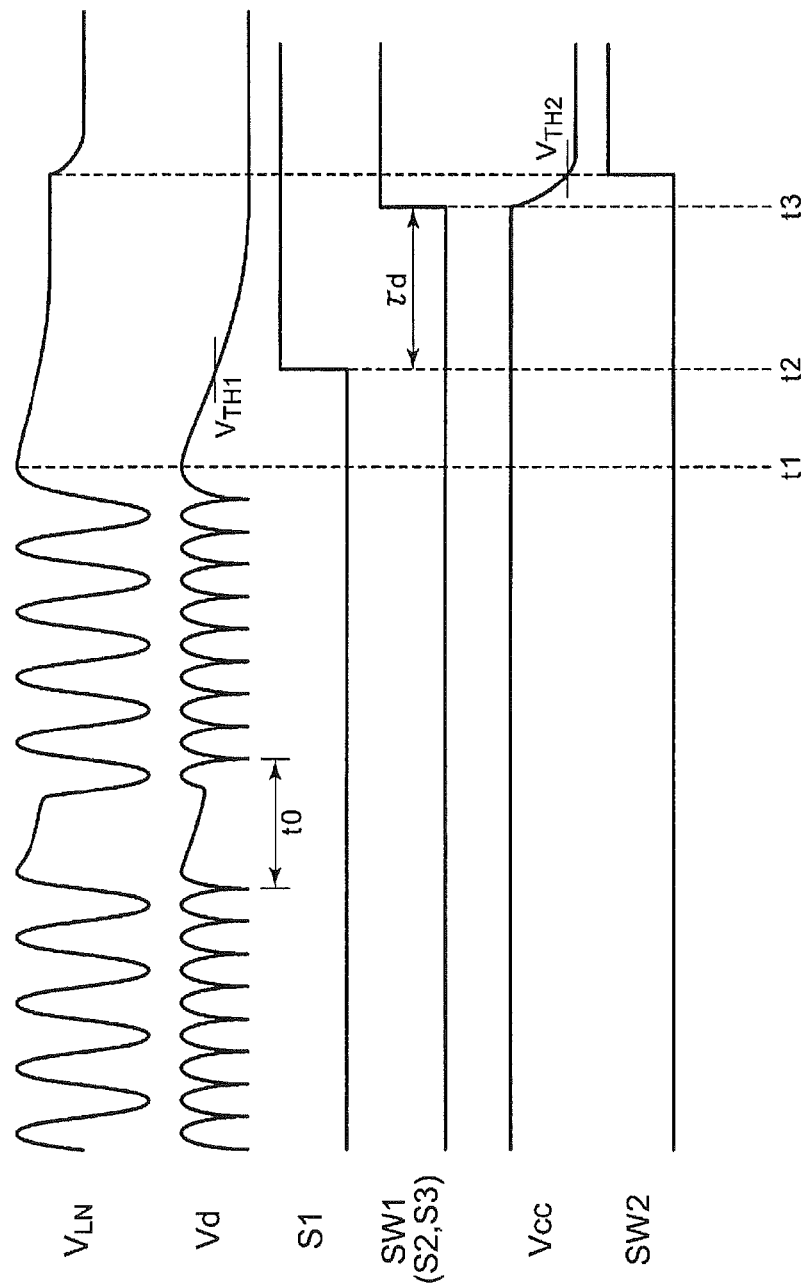
FIG. 4 is a timing diagram of actions of the power adapter of FIG. 2.

The above contents describe the structure of the power adapter 100; the following contents illustrate the actions thereof. FIG. 4 is a timing diagram of operations of the power adapter 100 of FIG. 2. From top to bottom, an electric potential difference $V_{LN}$ between the L line and the N line, the wave detection voltage Vd, the first comparison signal S1, the second comparison signal S2, and the control signal S3 are represented in sequence. For ease of understanding, vertical axes and horizontal axes of oscillogram and timing diagrams in this specification are enlarged or reduced in size, and various waveforms are simplified.

Before a time t1, the concentric plug 102 is inserted into the socket 2, so as to supply the AC voltage $V_{AC}$ between the L line and the N line. That is, a voltage $V_{LN}$ between the L line and the N line is in fact equal to the AC voltage $V_{AC}$.

If the concentric plug 102 is pulled out of the socket 2 at the time t1, the AC voltage $V_{AC}$ is not applied between the L-N lines, but residual charges remain in the capacitors C11, C12 of the filter circuit 10, so that a residual voltage is generated between the L-N lines.

When the supply of the AC voltage $V_{AC}$ is stopped, the wave detection voltage Vd decreases. If at a time t2 the wave detection voltage Vd is lower than the threshold voltage $V_{TH1}$, the first comparison signal S1 is enabled to be valid. After the first comparison signal S1 is enabled to be valid and after a detection period τd, the second comparison signal S2 is enabled to be valid, and meanwhile the control signal S3 is enabled to be valid. Therefore, the first discharge switch SW1 is turned on. When the first discharge switch SW1 is turned on, charges of the power supply terminal VCC are released, and the electric potential $V_{CC}$ of the power supply terminal VCC starts decreasing. When the electric potential $V_{CC}$ of the power supply terminal VCC is lower than the threshold voltage $V_{TH2}$ at a time t3, the second discharge switch SW2 is turned on. When the second discharge switch SW2 is turned on, the L line is grounded, so that the capacitors C11, C12 of the filter circuit 10 discharge, and the residual voltage decreases.

In this way, in the power adapter 100 according to the embodiment, after the concentric plug 102 is pulled out of the socket 2, the residual voltage is enabled to decrease below a predetermined level within a predetermined period, thereby complying with relevant regulations.

Furthermore, the first discharge switch SW1 and SW2 are turned off when the concentric plug is in the socket, thereby suppressing power consumption during normal use.

When the concentric plug 102 is inserted into the socket 2, a case can occur in which the AC voltage $V_{AC}$ can be interrupted after being affected by noise for several alternating cycles and recover afterward. A period t0 of FIG. 4 represents this case. During an interruption of the AC voltage $V_{AC}$ lasting several cycles, the discharge path 44 is not to be turned on. According to the power adapter 100 of FIG. 2, when the wave detection voltage Vd is continuously lower than the threshold voltage $V_{TH1}$ for the predetermined detection time, the discharge path 44 is turned on, so as to mask several cycles of alternating interruption, thereby keeping the discharge path 44 in a turn-off state.

The present invention is illustrated above based on the embodiment. The embodiment is exemplary, and the combination of constituent elements and processing processes thereof can vary. Persons skilled in the art will understand that such variations are also included in the scope of the present invention. Certain variations are illustrated below.

(First Variation)

Figure 5:
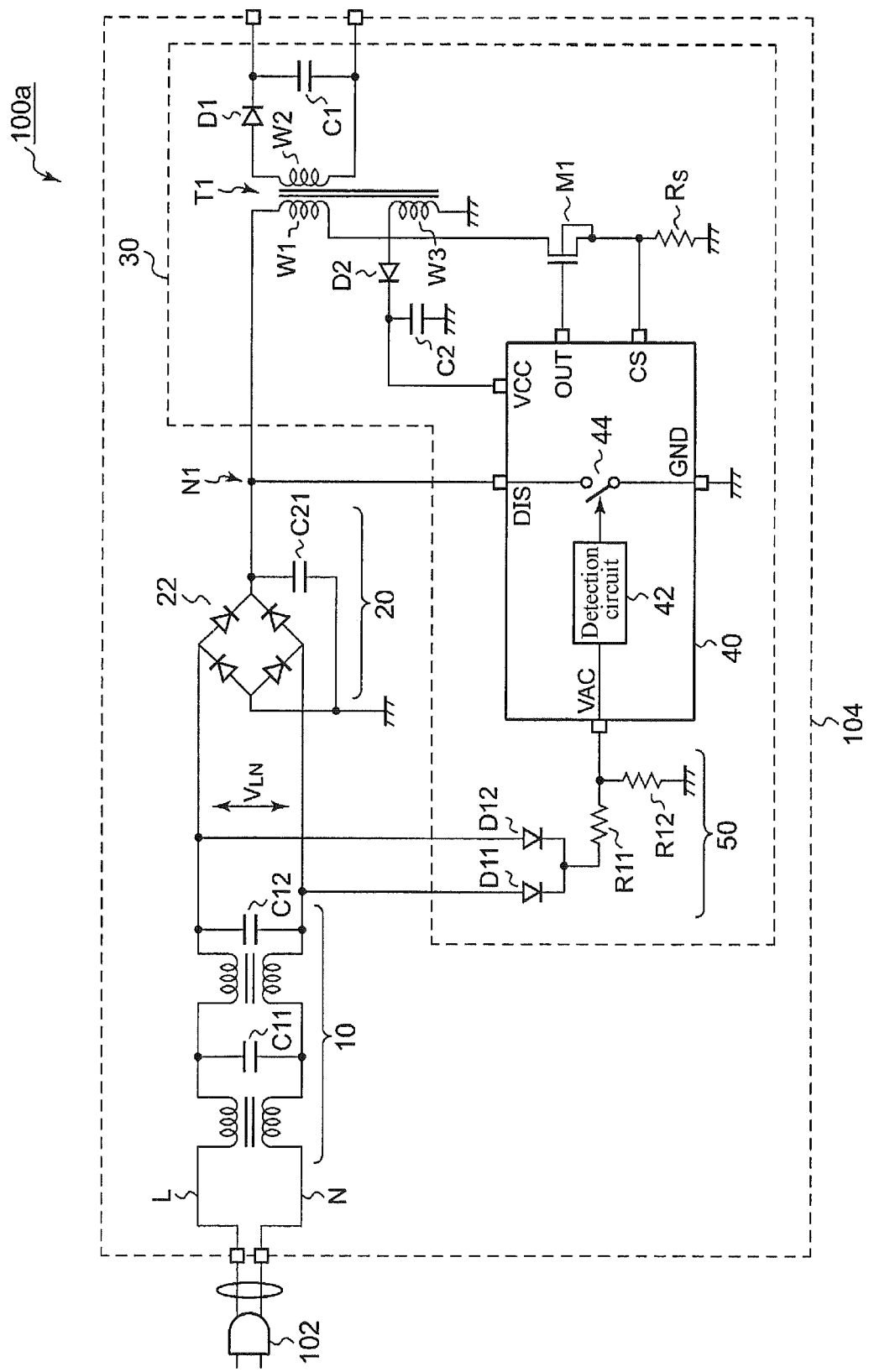
FIG. 5 is a circuit diagram illustrating the structure of a power adapter according to a first variation.

FIG. 5 is a circuit diagram illustrating the structure of a power adapter 100a according to a first variation. In FIG. 5, the discharge terminal DIS of the control IC 40 is connected to an output terminal N1 of the rectifier and smoothing circuit 20. The structure is otherwise the same as that of the power adapter 100 of FIG. 2.

The output terminal N1 of the rectifier and smoothing circuit 20 is connected to the L line and the N line through the diode of the diode bridge circuit 22. By connecting the discharge path 44, the charges of the capacitors C11, C12 of the filter circuit 10 are released through the diode bridge circuit 22 and the discharge path 44. Therefore, the same effect as that of the power adapter 100 of FIG. 2 can be achieved.

(Second Variation)

Figure 6:
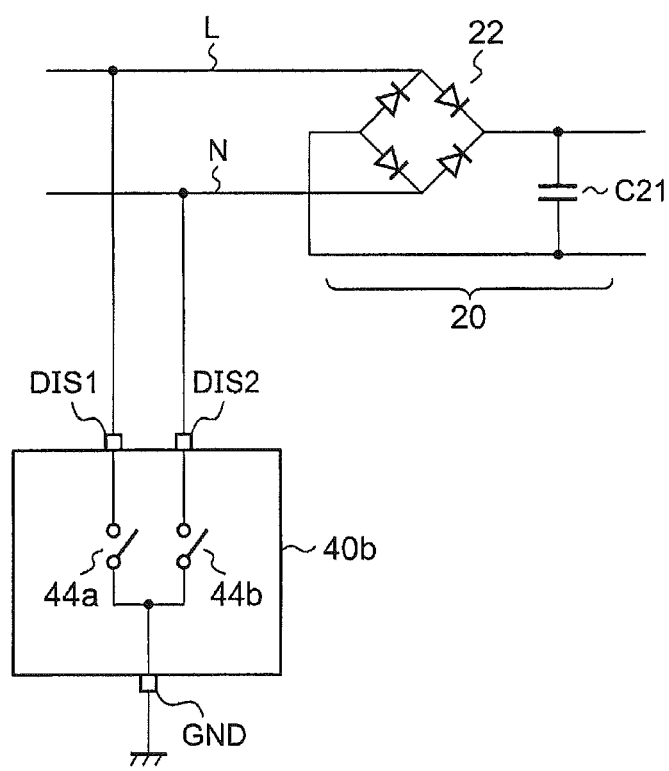
FIG. 6 is a circuit diagram illustrating the structure of a power adapter according to a second variation.

FIG. 6 is a circuit diagram illustrating the structure of a power adapter 100b according to a second variation. A control IC 40b includes two discharge terminals DIS1, DIS2, and two discharge paths 44a, 44b. The discharge terminals DIS 1, DIS2 are connected to the L line and the N line respectively. The discharge path 44a is disposed between the discharge terminal DIS1 and the ground terminal GND, and the discharge path 44b is disposed between the discharge terminal DIS2 and the ground terminal GND. The discharge paths 44a, 44b are controlled through a control signal S3 from the shared detection circuit 42.

In this variation, the charges of the capacitors C11, C12 of the filter circuit 10 are released through the discharge paths 44a, 44b, thereby shortening discharge time.

(Third Variation)

Figure 7:
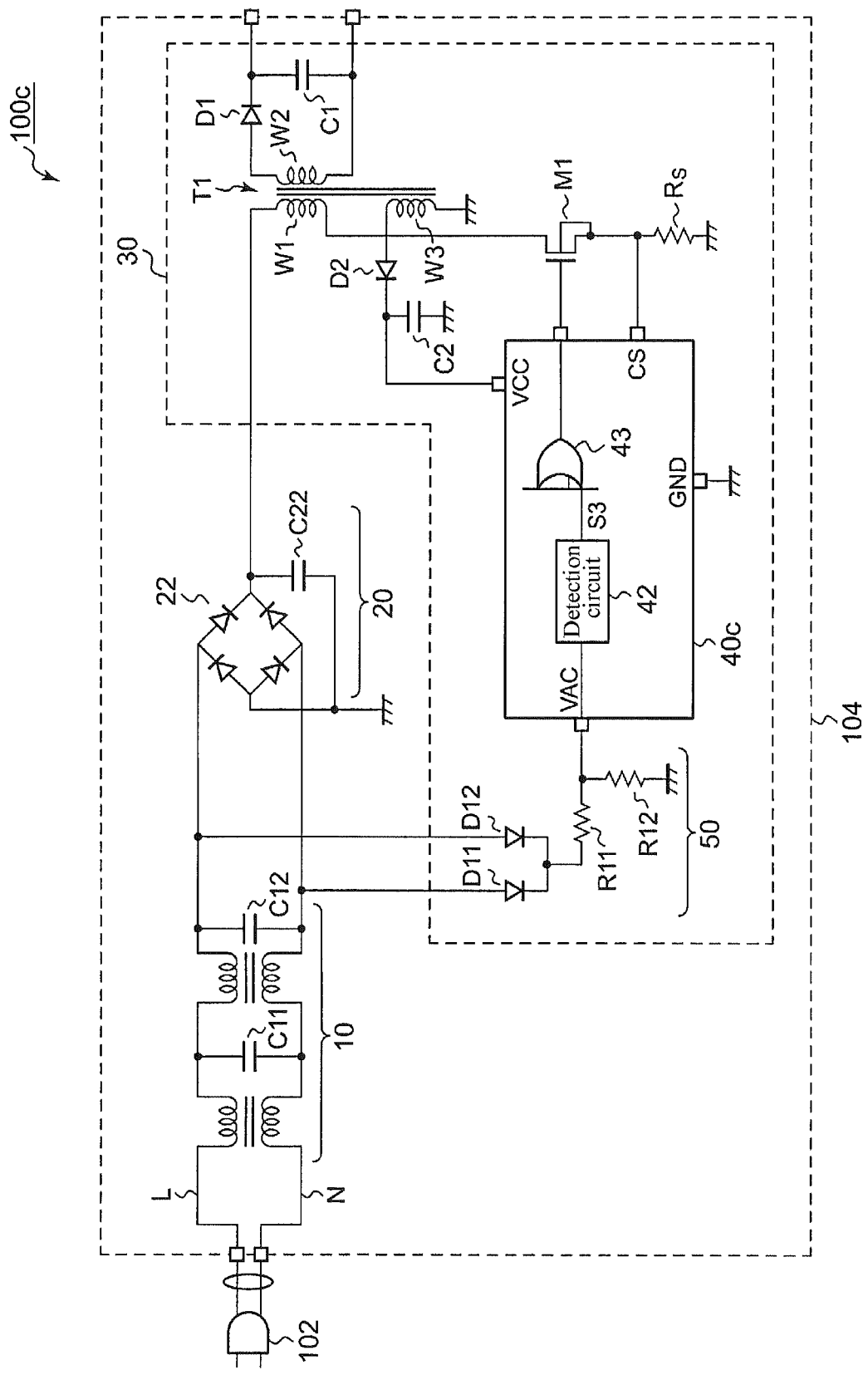
FIG. 7 is a circuit diagram illustrating the structure of a power adapter according to a third variation.

FIG. 7 is a circuit diagram illustrating the structure of a power adapter 100c according to a third variation. In this variation, the switching transistor M1 can be used as a discharge path, which takes the place of the discharge path 44 to be built in a control IC 40c. When a control signal S3 generated through the detection circuit 42 is valid, a driver 43 of the control IC 40c connects the switching transistor M1.

In this variation, the discharge terminal DIS and the discharge path 44 are not required, thereby reducing the area of the circuit.

In the embodiment, the AC/DC converter is illustrated as a power adapter, but the AC/DC converter can also be built in an electronic apparatus.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. An Alternating Current/Direct Current (AC/DC) converter, receiving an Alternating Current (AC) voltage through a concentric plug and converting the AC voltage into a Direct Current (DC) voltage, comprising:
  a Live (L) line and a Neutral (N) line, to which the AC voltage is applied;
  a filter circuit, comprising at least one capacitor disposed between the L line and the N line, and filtering the AC voltage;
  a rectifier and smoothing circuit, rectifying and smoothing an output of the filter circuit; and
  a Direct Current/Direct Current (DC/DC) converter, receiving an output voltage of the rectifier and smoothing circuit to generate a DC voltage;
  wherein the DC/DC converter comprises:
  an output capacitor;
  a first diode, having a cathode connected to the output capacitor;
  a second diode, having a cathode connected to a capacitor;
  a transformer, comprising a primary coil connected to an output terminal of the rectifier and smoothing circuit, a secondary coil connected to an anode of the first diode, and an auxiliary coil connected to an anode of the second diode;
  a switching transistor, connected to the primary coil;
  a control circuit, controlling the switching transistor; and
  a wave detection circuit, generating a wave detection voltage corresponding to an input voltage of the rectifier and smoothing circuit;
  wherein the control circuit comprises:
  a power supply terminal, connected to the cathode of the second diode and receiving a power supply voltage based on the DC voltage from the auxiliary coil;
  a ground terminal, grounded when in a use state;
  a first discharge terminal, connected to the N line without passing through the wave detection circuit;
  a first discharge path, disposed on a path from the first discharge terminal to the ground terminal and comprising:

a first discharge switch, disposed between the power supply terminal and the ground terminal; and
a second discharge switch, disposed between the first discharge terminal and the power supply terminal;
a detection terminal, receiving the wave detection voltage generated by the wave detection circuit; and
first threshold voltage, and enabling the first discharge path to be turned on;
wherein the control circuit is structured to:
  when the wave detection voltage is continuously lower than the first threshold voltage for a predetermined detection time, turn on the first discharge switch;
  with the first discharge switch being turned on, when an electric potential of the power supply terminal is decreased to be lower than a second threshold voltage, turn on the second discharge switch; and
  with the first discharge switch and the second discharge switch being turned on, discharge the charges of the capacitor, which is disposed between the L line and the N line, to the ground terminal.

2. The AC/DC converter according to claim 1, wherein the detection circuit comprises:
  a comparator, comparing the wave detection voltage with the first threshold voltage, and generating a valid first comparison signal when the wave detection voltage is lower than the first threshold voltage;
  a timer circuit, generating a valid second comparison signal when a valid time of the first comparison signal exceeds the detection time; and
  a logic gate, enabling the discharge path to be turned on when the first comparison signal and the second comparison signal are both valid.

3. An Alternating Current (AC) power adapter, comprising the Alternating Current/Direct Current (AC/DC) converter according to claim 2.

4. An electronic apparatus, comprising the Alternating Current/Direct Current (AC/DC) converter according to claim 2.

5. An Alternating Current (AC) power adapter, comprising the Alternating Current/Direct Current (AC/DC) converter according to claim 1.

6. An electronic apparatus, comprising the Alternating Current/Direct Current (AC/DC) converter according to claim 1.

7. The AC/DC converter according to claim 1, wherein the DC/DC converter comprises:
  a second discharge terminal, connected to the L line without passing through the wave detection circuit;
  a second discharge path, disposed on a path from the second discharge terminal to the ground terminal;
  wherein the detection circuit enables the second discharge path to be turned on when the wave detection voltage is maintained lower than the first threshold voltage for the predetermined detection time.

8. An Alternating Current/Direct Current (AC/DC) converter, receiving an Alternating Current (AC) voltage through a concentric plug and converting the AC voltage into a Direct Current (DC) voltage, comprising:

a Live (L) line and a Neutral (N) line, to which the AC voltage is applied;
a filter circuit, comprising at least one capacitor disposed between the L line and the N line, and filtering the AC voltage;
a rectifier and smoothing circuit, rectifying and smoothing an output of the filter circuit; and
a Direct Current/Direct Current (DC/DC) converter, receiving an output voltage of the rectifier and smoothing circuit to generate a DC voltage;
wherein the DC/DC converter comprises:
an output capacitor;
a first diode, having a cathode connected to the output capacitor;
a second diode, having a cathode connected to a capacitor;
a transformer, comprising a primary coil connected to an output terminal of the rectifier and smoothing circuit, a secondary coil connected to an anode of the first diode, and an auxiliary coil connected to an anode of the second diode;
a switching transistor, connected to the primary coil;
a control circuit, controlling the switching transistor; and
a wave detection circuit, generating a wave detection voltage corresponding to an input voltage of the rectifier and smoothing circuit; wherein the control circuit comprises:
a power supply terminal, connected to the cathode of the second diode and receiving a power supply voltage based on the DC voltage from the auxiliary coil;
a ground terminal, grounded when in a use state;
a discharge terminal, connected to the output terminal of the rectifier and smoothing circuit without passing through the wave detection circuit;
a discharge path, disposed on a path from the discharge terminal to the ground terminal and comprising:
a first discharge switch, disposed between the power supply terminal and the ground terminal; and
a second discharge switch, disposed between the discharge terminal and the power supply terminal;
a detection terminal, receiving the wave detection voltage generated by the wave detection circuit; and
first threshold voltage, and enabling the discharge path to be turned on;
wherein the control circuit is structured to:
  when the wave detection voltage is continuously lower than the first threshold voltage for a predetermined detection time, turn on the first discharge switch;
  with the first discharge switch being turned on, when an electric potential of the power supply terminal is decreased to be lower than a second threshold voltage, turn on the second discharge switch; and
  with the first discharge switch and the second discharge switch being turned on, discharge the charges of the capacitor, which is disposed between the L line and the N line, to the ground terminal.

* * * * *

UNITED STATES PATENT AND TRADEMARK OFFICE
CERTIFICATE OF CORRECTION

PATENT NO.        : 9,252,669 B2                                         Page 1 of 1
APPLICATION NO.   : 13/555384
DATED             : February 2, 2016
INVENTOR(S)       : Nate et al.

It is certified that error appears in the above-identified patent and that said Letters Patent is hereby corrected as shown below:

In the claims

Claim 1, insert --a detection circuit, comparing the wave detection voltage with a-- at column 9, line 6, after the word "and".

Claim 8, insert --a detection circuit, comparing the wave detection voltage with a-- at column 10, line 43, after the word "and".

Signed and Sealed this
Ninth Day of August, 2016

Michelle K. Lee
*Director of the United States Patent and Trademark Office*